United States Patent
Xiao et al.

(10) Patent No.: US 12,095,059 B2
(45) Date of Patent: Sep. 17, 2024

(54) THERMAL BARRIER COMPONENTS INCLUDING HYDRATES FOR MITIGATING THERMAL RUNAWAY IN BATTERIES

(71) Applicant: GM GLOBAL TECHNOLOGY OPERATIONS LLC, Detroit, MI (US)

(72) Inventors: Xingcheng Xiao, Troy, MI (US); Yangbing Zeng, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 130 days.

(21) Appl. No.: 17/482,236

(22) Filed: Sep. 22, 2021

(65) Prior Publication Data

US 2023/0087207 A1   Mar. 23, 2023

(51) Int. Cl.
*H01M 10/613*   (2014.01)
*H01M 10/653*   (2014.01)
(Continued)

(52) U.S. Cl.
CPC ....... *H01M 10/613* (2015.04); *H01M 10/653* (2015.04); *H01M 10/6566* (2015.04); *H01M 50/119* (2021.01); *H01M 10/625* (2015.04)

(58) Field of Classification Search
CPC ............. H01M 10/613; H01M 10/653; H01M 10/6566; H01M 10/625; H01M 50/119
See application file for complete search history.

(56) References Cited

U.S. PATENT DOCUMENTS

| | | | |
|---|---|---|---|
| 7,819,462 | B1 | 10/2010 | Owens |
| 8,033,592 | B2 | 10/2011 | Hsu et al. |

(Continued)

FOREIGN PATENT DOCUMENTS

| | | |
|---|---|---|
| CN | 115939614 A | 4/2023 |
| DE | 102019121849 A1 | 2/2021 |

(Continued)

OTHER PUBLICATIONS

First Office Action for German Patent Application No. 10 2022 120 234.8 issued on Mar. 16, 2023, with correspondence from Manitz Finsterwald Patent- und Rechtsanwaltspartnerschaft mbB summarizing Office Action; 6 pages.

(Continued)

*Primary Examiner* — Jimmy Vo
(74) *Attorney, Agent, or Firm* — Harness, Dickey & Pierce, P.L.C.

(57) ABSTRACT

A thermal barrier component for an electrochemical cell according to various aspects of the present disclosure includes a functional material. The functional material includes at least one of a hydrate of a metal carbonate and a hydrate of a metal phosphate. The functional material is configured to release water vapor at a first temperature of greater than or equal to about 100° C. and decompose to release a gaseous fire retardant at a second temperature of greater than or equal to about 300° C. Another thermal barrier component according to various aspects of the present disclosure includes a hydrate and a fire retardant. The hydrate is configured to release water in an amount greater than or equal to about 1 kg at a first temperature of greater than or equal to about 100° C. The fire retardant is configured to decompose at a second temperature of greater than or equal to about 300° C.

13 Claims, 3 Drawing Sheets

(51) Int. Cl.
   *H01M 10/6566* (2014.01)
   *H01M 50/119* (2021.01)
   *H01M 10/625* (2014.01)

(56) References Cited

U.S. PATENT DOCUMENTS

| | | |
|---|---|---|
| 10,665,913 B2 | 5/2020 | Syed et al. |
| 10,749,146 B2 | 8/2020 | Berger et al. |
| 2006/0106147 A1 | 5/2006 | Fasulo et al. |
| 2006/0199890 A1 | 9/2006 | Fasulo et al. |
| 2007/0299185 A1 | 12/2007 | Ottaviani et al. |
| 2010/0098925 A1 | 4/2010 | Fasulo et al. |
| 2011/0121225 A1 | 5/2011 | Posudievsky et al. |
| 2019/0330846 A1* | 10/2019 | Peng ........................ B32B 5/022 |
| 2021/0163303 A1* | 6/2021 | Evans ................. H01M 10/658 |
| 2023/0059036 A1 | 2/2023 | Xiao et al. |

FOREIGN PATENT DOCUMENTS

| | | | |
|---|---|---|---|
| DE | 102021118395 A1 * | 1/2023 | |
| DE | 102020005871 U1 | 2/2023 | |
| EP | 2755261 B1 | 12/2018 | |
| WO | WO-2019059198 A1 * | 3/2019 | ............... A62C 3/06 |
| WO | WO-2019163839 A1 * | 8/2019 | ............. B32B 15/02 |

OTHER PUBLICATIONS

Xiao, Xingcheng et al, "Thermal Barrier Component for Mitigating Thermal Runaway in Batteries"; U.S. Appl. No. 17/480,085, filed Sep. 20, 2021.

Bourbigot et al; "Zeolites: New Synergistic Agents for Intumescent Fire Retardant Thermoplastic Formulations—Criteria for the Choice of the Zeolite"; Fire and Materials, vol. 20, pp. 145-154 (1996).

Xiao et al; "Flame-Retardant Compositions for Energy Storage Devices, Methods of Manufacture Thereof and Batteries Containing the Same," U.S. Appl. No. 17/396,208, filed Aug. 6, 2021.

* cited by examiner

THERMAL BARRIER COMPONENTS INCLUDING HYDRATES FOR MITIGATING THERMAL RUNAWAY IN BATTERIES

INTRODUCTION

This section provides background information related to the present disclosure which is not necessarily prior art.

The present disclosure relates to thermal barrier components including hydrates for electrochemical cells/batteries to reduce or minimize thermal runaway propagation events. The present disclosure also relates to battery backs including the thermal barrier components and/or thermal barrier assemblies.

Advanced energy storage devices and systems are in demand to satisfy energy and/or power requirements for a variety of products, including automotive products such as start-stop systems (e.g., 12V start-stop systems), battery assisted systems, hybrid electric vehicles ("HEVs"), and electric vehicles ("EVs"). Lithium-ion electrochemical or batteries typically include a plurality of cells that may be electrically connected in a stack to increase overall output. In particular, the battery cells may include alternating positive electrodes and negative electrodes with separators disposed there between to define a stack. These battery cells thus form battery modules. The modules may be assembled into a battery pack that is disposed in an encasement or battery housing or cover.

SUMMARY

This section provides a general summary of the disclosure, and is not a comprehensive disclosure of its full scope or all of its features.

In various aspects, the present disclosure provides a thermal barrier component for an electrochemical cell. The thermal barrier component includes a functional material. The functional material includes at least one of a hydrate of a metal carbonate and a hydrate of a metal phosphate. The functional material is configured to release water vapor at a first temperature of greater than or equal to about 100° C. The functional material is configured to decompose to release a gaseous fire retardant at a second temperature of greater than or equal to about 300° C.

In one aspect, the functional material includes the hydrate of the metal carbonate. The gaseous fire retardant includes carbon dioxide.

In one aspect, the metal carbonate is selected from the group consisting of: sodium carbonate, potassium carbonate, magnesium carbonate, sodium carbonate, potassium carbonate, magnesium carbonate, cerium carbonate, barium carbonate, copper carbonate, zinc carbonate, iron carbonate, or any combination thereof, and combinations thereof.

In one aspect, the functional material includes the hydrate of the metal phosphate. The gaseous fire retardant includes a phosphor radical.

In one aspect, the metal phosphate is selected from the group consisting of: ammonium phosphate, magnesium phosphate, calcium phosphate, iron phosphate, sodium phosphate, calcium phosphate, iron phosphate, and or combination thereof, and combinations thereof.

In one aspect, the thermal barrier component further includes another hydrate. The hydrate is selected from the group consisting of: ammonium sulfate hydrate, calcium sulfate hydrate, aluminum sulfate hydrate, copper sulfate hydrate, magnesium sulfate hydrate, zinc sulfate hydrate, zirconium sulfate hydrate, vanadium oxide sulfate hydrate, or combinations thereof.

In one aspect, the thermal barrier component further includes a porous glass fiber mat and a plurality of particles. The particles of the plurality are disposed in pores of the porous glass fiber mat. The plurality of particles includes the functional material.

In one aspect, the thermal barrier component further includes a polymer binder.

In one aspect, the thermal barrier component has a porosity of greater than or equal to about 40% to less than or equal to about 60%.

In one aspect, the thermal barrier component is configured to absorb greater than or equal to about 1 MJ of heat.

In various aspects, the present disclosure provides a thermal barrier component for an electrochemical cell. The thermal barrier component includes a hydrate and a fire retardant. The hydrate is configured to release water in an amount greater than or equal to about 1 kg at a first temperature of greater than or equal to about 100° C. The fire retardant is configured to decompose at a second temperature of greater than or equal to about 300° C.

In one aspect, the hydrate is selected from the group consisting of: ammonium sulfate hydrate, calcium sulfate hydrate, aluminum sulfate hydrate, copper sulfate hydrate, magnesium sulfate hydrate, zinc sulfate hydrate, zirconium sulfate hydrate, vanadium oxide sulfate hydrate, and combinations thereof.

In one aspect, the fire retardant is selected from the group consisting of: $(NH_4)_3PO_4$, $Al(OH)_3$, $Mg(OH)_2$, $Mg_3Ca(CO_3)_4$, $MgCO_3$, $NaNO_3$, $K_2CO_3$, $Na_2CO_3$, KCl, NaCl, and combinations thereof.

In various aspects, the present disclosure provides a method of assembling a battery pack. The method includes incorporating a functional material in thermal contact with a battery cell. The functional material includes at least one of a hydrate of a metal carbonate and a hydrate of a metal phosphate. The functional material is configured to release water vapor at a first temperature of greater than or equal to about 100° C. The functional material is configured to decompose to release a gaseous fire retardant at a second temperature of greater than or equal to about 300° C. The method further includes enclosing the battery cell and the functional material in a housing.

In one aspect, the method further includes preparing a thermal barrier component including a glass fiber mat and a plurality of particles in pores of the glass fiber mat. The plurality of particles includes the functional material. The incorporating includes disposing the thermal barrier component in thermal contact with the battery cell.

In one aspect, the preparing includes preparing a slurry including the plurality of particles. The preparing further includes using vacuum infiltration or dip coating to incorporate the slurry into the pores. The preparing further includes at least partially drying the slurry to reduce a liquid content of the slurry.

In one aspect, a porosity of the glass fiber mat is greater than or equal to about 90% and a porosity of the thermal barrier component is greater than or equal to about 40% to less than or equal to about 60%.

In one aspect, the incorporating includes, preparing a slurry including a plurality of particles. The plurality of particles includes the functional material. The incorporating further includes disposing the slurry in at least a portion of a void space of the battery pack. The preparing further includes forming a thermal barrier component by at least partially drying the slurry to reduce a moisture content of the slurry.

In one aspect, the preparing includes admixing the plurality of particles with an aqueous binder.

In one aspect, a porosity of the thermal barrier component is greater than or equal to about 40% to less than or equal to about 60%.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure provides a thermal barrier component for an electrochemical cell, such as a battery. The thermal barrier component includes a hydrate capable of absorbing heat to release water vapor. The water is vaporized directly from its solid hydrate form, avoiding the use or generation of liquid water, and thereby reducing or preventing corrosion, short circuits, and undesirable reactions with materials of the electrochemical cell (e.g., lithium). The water is release at a first temperature of greater than or equal to about 100° C. The thermal barrier component further includes a fire retardant that is released at a second temperature of greater than or equal to about 300° C. Release of the water and the fire retardant may be endothermic. The fire retardant may be part of the hydrate (e.g., a metal carbonate hydrate or a metal phosphate hydrate) or distinct from the hydrate. Accordingly, the thermal barrier component provides different mechanisms of thermal runaway mitigation at different temperatures.

Figure 1:
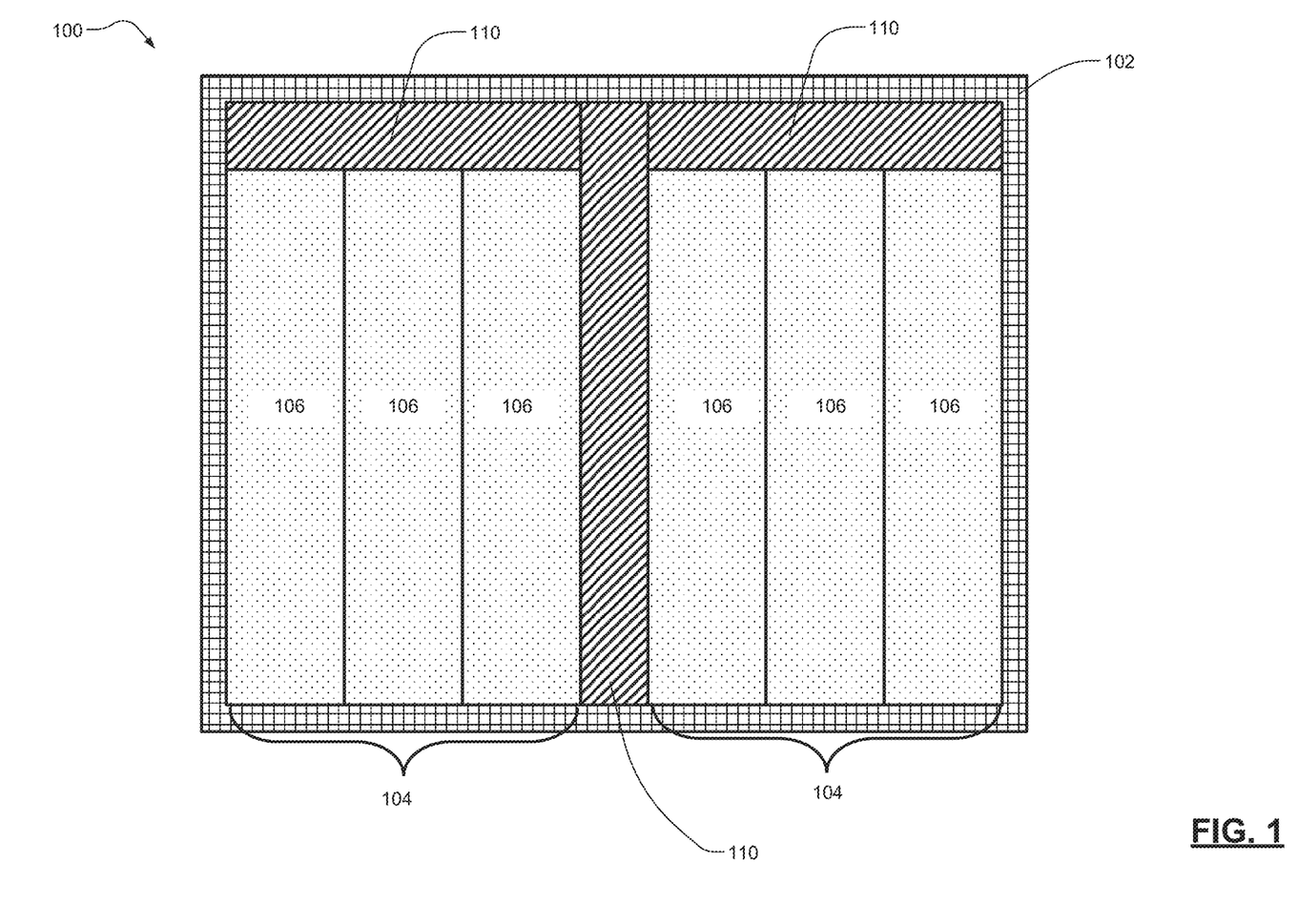
FIG. 1 is a schematic illustration of a battery pack including a thermal barrier component according to various aspects of the present disclosure.

With reference to FIG. 1, a battery pack 100 according to various aspects of the present disclosure is provided. The battery back 100 includes a housing or pouch 102. The battery pack 100 further includes one or more battery modules 104. Each of the battery modules 104 generally includes a plurality of battery cells 106 (that may be provided in subassemblies of stacks or blocks) that may be disposed in a frame or other structure in each battery module 104 for protection from external forces or heat. Any number of the cells, blocks and/or battery modules may be selected and connected to a positive or negative source terminal. The cells, blocks and battery modules may be connected in series and/or in parallel; in different connected configurations; and may be organized into blocks, packs, and/or groups. The battery cells 106 and module(s) 104 may be connected and controlled via a battery management system ("BMS"—not shown) that can help to control and manage various aspects of the battery operation, including power output, voltage, current, temperature, SOX, and the like. The housing 102 thus can encase battery pack 102 thus includes one or more battery modules 104, the BMS, and optionally a cooling system (not shown). These are contained an interior compartment of the housing 102 along with any other electrical conduits or conventional components, such as bus bars, circuitry, and portions of terminals for external connection to a load and power source.

The battery pack 100 further includes one or more thermal barrier components 110. The thermal barrier components 110 may be disposed between adjacent battery modules 104 and/or between battery modules 104 and the housing 102 (e.g., above battery modules 104, as shown, below battery modules 104, and/or along sides of battery modules 104). The thermal barrier components 110 may be configured to reduce or minimize TRP, which may be an uncontrolled high temperature thermal event, including a conflagration or fire. As referred to herein, such a TRP event may be caused by a thermal load that is excessive and beyond the range of normal operational temperatures. By way of example, a TRP may result if a short circuit arises within the battery. For example, a source of heat or flame in a thermal runaway propagation event may exceed temperatures of about 500° C., optionally about 600° C., optionally about 700° C., optionally about 800° C., optionally about 900° C. optionally about 1,000° C., optionally about 1,100° C., and optionally may exceed about 1,200° C. The source of heat or flame may originate in the interior compartment of the battery housing or module. In certain aspects, the battery pack 100 is free of an active fire extinguisher.

In various aspects, the thermal barrier component 110 includes a functional material. The functional material may be a solid. In certain aspects, the functional material may be in the form of a plurality of particles. The functional material may include a hydrate, a fire retardant, or a combination thereof.

In certain aspects, the hydrate is configured to release water vapor at a first temperature. The first temperature may be greater than or equal to about 80° C., optionally greater than or equal to about 90° C., optionally greater than or equal to about 100° C., optionally greater than or equal to about 110° C., optionally greater than or equal to about 120° C., optionally greater than or equal to about 130° C., optionally greater than or equal to about 140° C., optionally greater than or equal to about 150° C., optionally greater than or equal to about 160° C., or optionally greater than or equal to about 175° C. The first temperature may be less than or equal to about 200°, optionally less than or equal to about 175°, optionally less than or equal to about 160°, optionally less than or equal to about 150°, optionally less than or equal to about 140°, optionally less than or equal to about 130°, optionally less than or equal to about 120°, optionally less than or equal to about 110°, or optionally less than or equal to about 100°.

In certain aspects, the hydrate may be configured to release a fire retardant or extinguisher. The fire retardant may be configured to react with flammable gases, such as from a thermally-decomposing electrolyte, to suppress or terminate combustion chain branch reactions.

Hydrates configured to release a fire retardant may include a metal carbonate hydrate, a metal phosphate hydrate, or a combination thereof. The metal carbonate hydrate may be configured to release carbon dioxide as a fire retardant chemical. In certain aspects, the metal carbonate hydrate may include a hydrate of sodium carbonate, potassium carbonate, magnesium carbonate, cerium carbonate, barium carbonate, copper carbonate, zinc carbonate, iron carbonate, or any combination thereof. The metal phosphate hydrate may be configured to release a phosphor radical as a fire retardant. In certain aspects, the metal phosphate hydrate includes a hydrate of ammonium phosphate, magnesium phosphate, calcium phosphate, iron phosphate, sodium phosphate, calcium phosphate, iron phosphate, and or combination thereof.

The hydrate may be configured to release the fire retardant via thermal decomposition. In certain aspects, the fire retardant is configured to release the fire retardant at a second temperature of greater than or equal to about 200° C., optionally greater than or equal to about 250° C., optionally greater than or equal to about 300° C., optionally greater than or equal to about 350° C., optionally greater than or equal to about 400° C., optionally greater than or equal to about 450° C., optionally greater than or equal to about 500° C., optionally greater than or equal to about 550° C., optionally greater than or equal to about 600° C., optionally greater than or equal to about 650° C., optionally greater than or equal to about 700° C., optionally greater than or equal to about 750° C., optionally greater than or equal to about 800° C., or optionally greater than or equal to about 850° C. The second temperature may be less than or equal to about 900° C., optionally less than or equal to about 850° C., optionally less than or equal to about 800° C., optionally less than or equal to about 750° C., optionally less than or equal to about 700° C., optionally less than or equal to about 650° C., optionally less than or equal to about 600° C., optionally less than or equal to about 550° C., optionally less than or equal to about 500° C., optionally less than or equal to about 450° C., optionally less than or equal to about 400° C., or optionally less than or equal to about 350° C.

In certain aspects, in addition to or as an alternative to the fire retardant-releasing hydrates described above, the functional material may a hydrate that does not release a fire retardant during decomposition. The hydrate may include ammonium sulfate hydrate, calcium sulfate hydrate, aluminum sulfate hydrate, copper sulfate hydrate, magnesium sulfate hydrate, zinc sulfate hydrate, zirconium sulfate hydrate, vanadium oxide sulfate hydrate, or any combination thereof.

In certain aspects, the functional material of the thermal barrier component 110 further includes a fire retardant that is distinct from the hydrate. The fire retardant may include an acid agent for intumescent formation. In certain aspects, the fire retardant includes a phosphate-based fire retardant (e.g., $(NH_4)_3PO_4$), a carbonate-based fire retardant (e.g., $MgCO_3$, $Mg_3Ca(CO_3)_4$, $K_2CO_3$, $Na_2CO_3$), a nitrate-based fire retardant (e.g., $NaNO_3$), a hydroxide-based FR (e.g., $Al(OH)_3$, $Mg(OH)_2$), a chloride-based FR (e.g., KCl, NaCl), any other suitable FR, or any combination thereof. In certain aspects, the fire retardant includes $(NH_4)_3PO_4$, $Al(OH)_3$, $Mg(OH)_2$, $Mg_3Ca(CO_3)_4$, $MgCO_3$, $NaNO_3$, $K_2CO_3$, $Na_2CO_3$, KCl, NaCl, or any combination thereof.

In certain aspects, the thermal barrier component 110 may further include a binder. The binder may be a polymeric binder. The binder may be an aqueous polymeric binder. In certain other aspects, the thermal barrier component 110 may be free of a binder. In certain aspects, a portion of water from the aqueous binder may be adsorbed in the synergistic reaction agent and remain in the thermal barrier component.

In certain aspects, the binder may include a polymer binder. The polymer binder may include a cellulose polymer binder, epoxy, polyester, phenolic resins, starches, sucrose, lactose, or any combination thereof.

In certain aspects, the release of water at the first temperature and release of fire retardant at the second temperature are endothermic. A hydrate, fire retardant-hydrate, and/or fire retardant composition and/or amount may be chosen based on a desired heat absorption. In certain aspects, the hydrate (and therefore the thermal barrier component) is configured to release greater than or equal to about 1 kg of water, optionally greater than or equal to about 2 kg of water, optionally greater than or equal to about 3 kg of water, optionally greater than or equal to about 5 kg of water, optionally greater than or equal to about 7 kg of water, or optionally greater than or equal to about 10 kg of water. In certain aspects, the thermal barrier component is configured to absorb greater than or equal to about 1 MJ of heat, optionally greater than or equal to about 5 MJ of heat, optionally greater than or equal to about 10 MJ of heat, optionally greater than or equal to about 15 MJ of heat, optionally greater than or equal to about 20 MJ of heat, optionally greater than or equal to about 25 MJ of heat, or optionally greater than or equal to about 30 MJ of heat.

The functional materials (i.e., hydrate, flame retardant) may be incorporated into a porous material or a porous matrix to form the thermal barrier component 110. In certain aspects, the functional materials are incorporated into a porous matrix to form a discrete thermal barrier component that may be placed into a battery pack (see FIGS. 3-4 and accompanying discussion). In other aspects, a thermal barrier component is formed in situ within an interior region of a battery pack (see FIG. 5 and accompanying discussion).

In certain aspects, the thermal barrier component 110 is configured to permit gas venting. The porous material may have a porosity of greater than or equal to about 30 weight percent, greater than or equal to about 35 weight percent, greater than or equal to about 40 weight percent, greater than or equal to about 45 weight percent, greater than or equal to about 50 weight percent, greater than or equal to about 55 weight percent, or optionally greater than or equal to about 60 weight percent. The thermal barrier component may have a porosity of less than or equal to about 70 weight percent, optionally less than or equal to about 65 weight percent, optionally less than or equal to about 60 weight percent, optionally less than or equal to about 55 weight percent, optionally less than or equal to about 50 weight percent, optionally less than or equal to about 45 weight percent, or optionally less than or equal to about 40 weight percent. In certain aspects, the thermal barrier component may have a tortuosity of greater than or equal to about 3.

Figure 2:
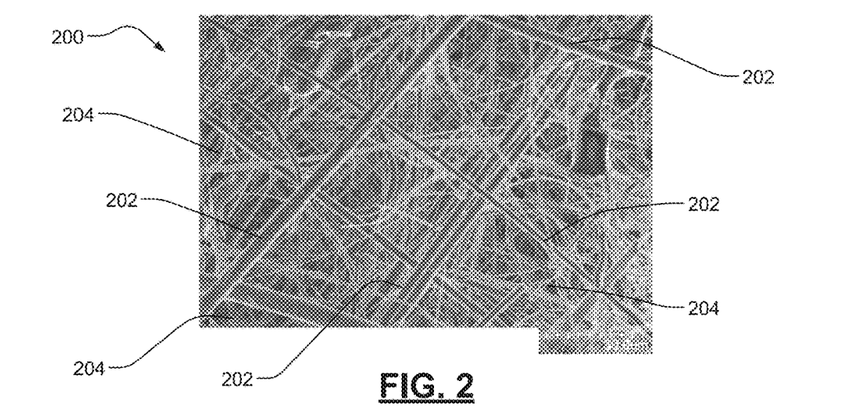
FIG. 2 is a scanning electron microscope image of a glass fiber matrix according to various aspects of the present disclosure.

With reference to FIG. 2, a glass fiber matrix 200 according to various aspects of the present disclosure is provided. The glass fiber matrix 200 includes a plurality of glass fibers 202 and void space or pores 204 between the glass fibers. The void space 204 may occupy greater than or equal to about 80% of a volume of the glass fiber matrix 200. Accordingly, the glass fiber matrix 200 may have a porosity of about 90%.

Figure 3:
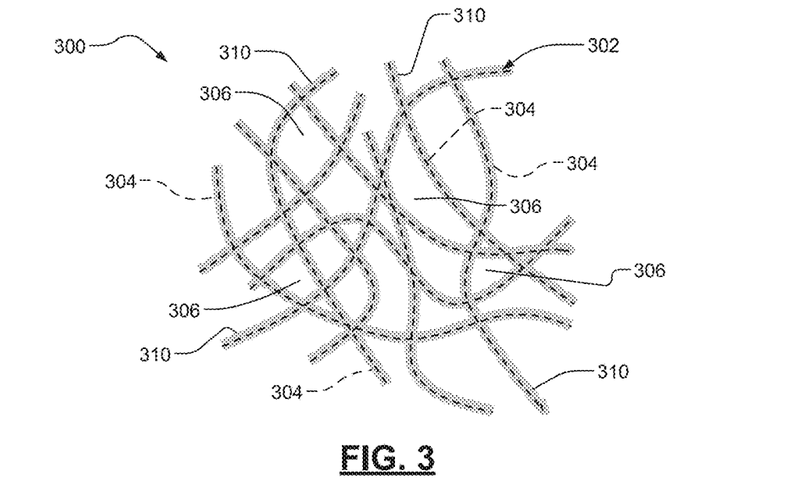
FIG. 3 is a schematic illustration of a portion of a glass fiber matrix having functional materials coated thereon according to various aspects of the present disclosure.

Referring to FIG. 3, a portion of a thermal barrier component 300 according to various aspects of the present disclosure is provided. The thermal barrier component 300 includes porous matrix 302, which may include glass fibers, a carbon fibers, or polymer foam, by way of example. The porous matrix 302 may be in the form of a mat or sheet, optionally having a similar height and width compared to battery cells (see, e.g., battery cells 106). The porous matrix may include a plurality of fibers 304. Pores or void spaces 306 are defined between the fibers 304. The porous matrix 302 may define a porosity of greater than or equal to about 80%, or optionally greater than or equal to about 90% (i.e., prior to incorporation of functional materials).

At least a portion of the fibers 304 are at least partially coated with a functional material 310. The functional material 310 includes a hydrate, optionally a fire retardant as part of the hydrate or as a distinct compound, and optionally a binder, as described above. The porous matrix 302 may retain a high porosity after being coated with the functional materials, as shown.

Figure 4:
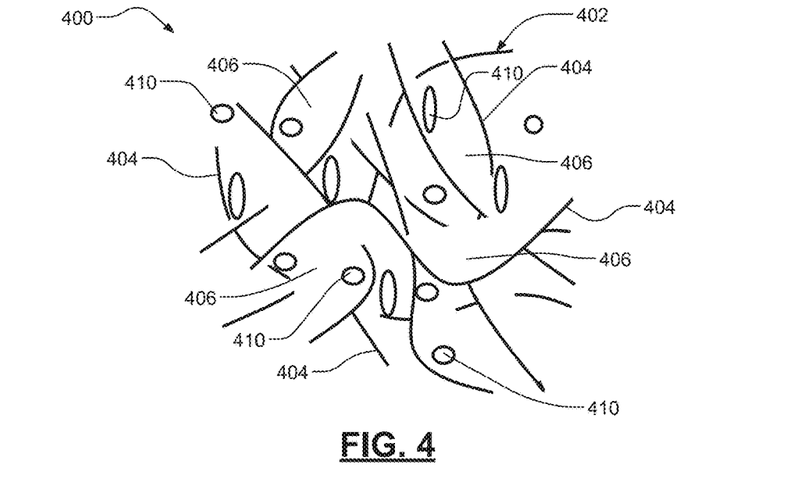
FIG. 4 is a schematic illustration of a portion of a glass fiber matrix having particles of functional material disposed in voids according to various aspects of the present disclosure.

With reference to FIG. 4, a portion of a thermal barrier component 400 according to various aspects of the present disclosure is provided. The thermal barrier component 400 includes a porous matrix 402, which may include glass fibers, a carbon fibers, or polymer foam, by way of example. The porous matrix 402 may be in the form of a mat or sheet, optionally having a similar height and width compared to battery cells (see, e.g., battery cells 106). The porous matrix 402 includes a plurality of fibers 404. Pores or void spaces 406 are defined between the fibers 404. The porous matrix 402 defines a porosity of greater than or equal to about 80%, or optionally greater than or equal to about 90% (i.e., prior to incorporation of functional materials).

A functional material 410 is incorporated into a portion of the void space 406. The functional material 410 may be in the form a plurality of particles. The functional material 410 includes a hydrate, optionally a fire retardant as part of the hydrate or as a distinct compound, and optionally a binder, as described above. The porous matrix 402 may retain a high porosity after inclusion of the functional materials, as shown.

Figure 5:
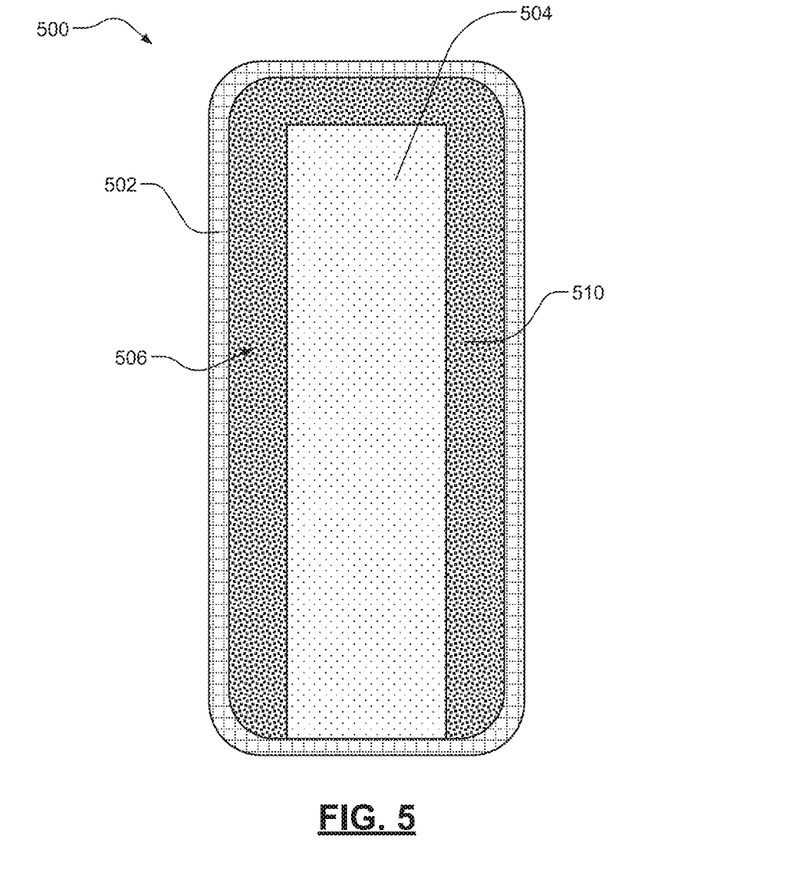
FIG. 5 is a schematic illustration of a battery pack including an in situ-formed thermal barrier component according to various aspects of the present disclosure.

Referring to FIG. 5, a battery pack 500 according to various aspects of the present disclosure is provided. The battery pack 500 includes a housing 502 and a battery cell 504. The housing 502 defines an interior region 506. A thermal barrier component 510 may be disposed in the interior region 506, such as in regions not occupied by the battery cell 504 and other components.

The thermal barrier component 510 includes a functional material. The functional material includes a hydrate and optionally a fire retardant as part of the hydrate or as a distinct compound. The thermal barrier component further includes a binder. In certain aspects, the thermal barrier component 510 may be formed in situ in the housing 502, as will be described below. However, the thermal barrier component 510 may alternatively be formed prior to incorporation in the housing, such as in the form of a mats or sheets, and subsequently be placed in the housing.

Any of the thermal barrier components 110, 300, 400, 510 described herein may be used alone or incorporated into a thermal barrier assembly including multiple layers, which may be the same or different. By way of example, other layers may include polymer foam (e.g., urethane foam), metal plates (e.g., aluminum plates), or other materials (e.g., aerogel). The other layers may be porous and may further include additional functional materials, such as fire retardants.

The thermal barrier components 110, 300, 400, 510 or thermal barrier assemblies may be encapsulated or sealed with an encapsulant. The encapsulant may include polyethylene terephthalate (PET) film, or any combination thereof.

In various aspects, the present disclosure provides a method of manufacturing or assembly a battery pack including the thermal barrier components or assemblies of the present disclosure. The method generally includes incorporating a plurality of particles in thermal contact with a battery cell and enclosing the battery cell and the plurality of particles in a housing. In certain aspects, the present disclosure also provides a method of making the thermal barrier components and assemblies. The thermal barrier components may be prefabricated or formed in situ within the battery pack housing.

In certain aspects, a thermal barrier component is prefabricated (i.e., prior to incorporation in a battery pack). Prefabrication may include incorporating the functional material into a porous mat or matrix (e.g., a glass fiber mat) or forming a mat including the functional material.

Incorporating functional material into a porous mat or matrix may include forming a slurry including the functional material, a binder, and a solvent. The solvent may include water or ethanol, for example. The slurry may be incorporated into the porous matrix by dip coating (see, e.g., FIG. 3) or vacuum infiltration (see, e.g., FIG. 4), by way of example. The slurry may be dried to remove at least a portion of the solvent.

Forming a mat including the functional material may include forming a slurry including the functional material, a binder, an a solvent. The slurry may be poured or otherwise arranged to form a mat or other desired shape, optionally within a mold. The slurry may be dried to remove at least a portion of the solvent.

A ratio of functional material (e.g., hydrate) to binder, a viscosity of the slurry, a drying speed, and/or a drying temperature may be optimized to achieve a desired porosity and/or tortuosity of the resulting thermal barrier component.

In certain aspects, a thermal barrier component is fabricated in situ (i.e., within the battery pack housing). The method may include forming a slurry including the functional material, the binder, and the solvent. The slurry may be poured into at least a portion of an interior region of the battery back, such as surrounding the battery cells. The slurry is dried to form the thermal barrier component. A ratio of functional material to binder, a viscosity of the slurry, a drying speed, and/or a drying temperature may be optimized to achieve a desired porosity and/or tortuosity of the resulting thermal barrier component, as described above.

Pour into void space; control porosity and tortuosity to get desired gas venting characteristics.

While the thermal barrier components, and thermal barrier assemblies, and battery packs provided by the present technology are particularly suitable for use in components of an automobile or other vehicles (e.g., motorcycles, boats, tractors, buses, motorcycles, trains, mobile homes, campers, and tanks), they may also be used in a variety of other industries and applications, including aerospace components, consumer goods, devices, buildings (e.g., houses, offices, sheds, warehouses), office equipment and furniture, and industrial equipment machinery, agricultural or farm equipment, or heavy machinery, by way of limiting example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermal barrier component for an electrochemical cell, the thermal barrier component consisting essentially of:
   a porous matrix;
   a binder; and
   at least one functional material admixed with the binder such that the binder has the functional material disposed therein, and the binder and the functional material at least partially coat the porous matrix, the at least one functional material including at least one of a hydrate of a metal carbonate and a hydrate of a metal phosphate, wherein the at least one functional material is configured to release water vapor at a first temperature of greater than or equal to about 100° C. and decompose to release a gaseous fire retardant at a second temperature of greater than or equal to about 300° C.

2. The thermal barrier component of claim 1, wherein the at least one functional material includes the hydrate of the metal carbonate and the gaseous fire retardant includes carbon dioxide.

3. The thermal barrier component of claim 2, wherein the metal carbonate is selected from the group consisting of: sodium carbonate, potassium carbonate, magnesium carbonate, sodium carbonate, potassium carbonate, magnesium carbonate, cerium carbonate, barium carbonate, copper carbonate, zinc carbonate, iron carbonate, or combinations thereof, and combinations thereof.

4. The thermal barrier component of claim 1, wherein the at least one functional material includes the hydrate of the metal phosphate and the gaseous fire retardant includes a phosphor radical.

5. The thermal barrier component of claim 4, wherein the metal phosphate is selected from the group consisting of: ammonium phosphate, magnesium phosphate, calcium phosphate, iron phosphate, sodium phosphate, calcium phosphate, iron phosphate, and or combination thereof, and combinations thereof.

6. The thermal barrier component of claim 1, wherein the at least one functional material further includes
another hydrate selected from the group consisting of: ammonium sulfate hydrate, calcium sulfate hydrate, aluminum sulfate hydrate, copper sulfate hydrate, magnesium sulfate hydrate, zinc sulfate hydrate, zirconium sulfate hydrate, vanadium oxide sulfate hydrate, and combinations thereof.

7. The thermal barrier component of claim 1, wherein the porous matrix is a porous glass fiber mat.

8. The thermal barrier component of claim 1, wherein the binder is a polymer binder.

9. The thermal barrier component of claim 1, wherein the thermal barrier component has a porosity of greater than or equal to about 40% to less than or equal to about 60%.

10. The thermal barrier component of claim 1, wherein the thermal barrier component is configured to absorb greater than or equal to about 1 MJ of heat.

11. A thermal barrier component of an electrochemical cell, the thermal barrier component consisting essentially of:
a porous matrix; and
a binder;
at least one hydrate admixed with the binder, the at least one hydrate configured to release water in an amount greater than or equal to about 1 kg at a first temperature of greater than or equal to about 100° C.; and
at least one fire retardant admixed with the binder, the at least one fire retardant configured to decompose at a second temperature of greater than or equal to about 300° C., wherein the binder, the at least one hydrate, and the at least one fire retardant at least partially coat the porous matrix, wherein the binder has the at least one hydrate and the at least one fire retardant therein, and the binder, the at least one hydrate, and the at least one fire retardant at least partially coat the porous matrix.

12. The thermal barrier component of claim 11, wherein the at least one hydrate is selected from the group consisting of: ammonium sulfate hydrate, calcium sulfate hydrate, aluminum sulfate hydrate, copper sulfate hydrate, magnesium sulfate hydrate, zinc sulfate hydrate, zirconium sulfate hydrate, vanadium oxide sulfate hydrate, and combinations thereof.

13. The thermal barrier component of claim 11, wherein the at least one fire retardant is selected from the group consisting of: $(NH_4)_3PO_4$, $Al(OH)_3$, $Mg(OH)_2$, $Mg_3Ca(CO_3)_4$, $MgCO_3$, $NaNO_3$, $K_2CO_3$, $Na_2CO_3$, KCl, NaCl, and combinations thereof.

* * * * *